Patented Nov. 29, 1949

2,489,711

UNITED STATES PATENT OFFICE 2,489,711

RUBBER-LIKE CURED POLYESTERS AND PROCESS FOR PREPARING SAME

David W. Jayne, Jr., Old Greenwich, and Harold M. Day, Cos Cob, Conn., assignors to American Cyanamid Company, New York, N. Y., a corporation of Maine

REISSUED APR 18 1950

No Drawing. Application December 18, 1946, Serial No. 717,088

6 Claims. (Cl. 260—76)

This invention relates to high molecular weight polyesters and more specifically, to co-condensation products of omega-hydroxy aliphatic carboxylic acids with glycol esters.

Linear polyesters of high molecular weight are known in the art. These materials are prepared by the reaction of dihydric alcohols with dicarboxylic acids or by the reaction of a hydroxy acid with itself. Moreover, cross-linked polyesters wherein the linear polyesters are cross-linked by means of a small proportion of a polyfunctional compound such as glycerol, tricarballylic acid, diethanolamine, diethylenetriamine, etc., are described as, for example, in Patent No. 2,363,581.

It is an object of the present invention to prepare derivatives of the linear polyesters obtained by reaction of an omega-hydroxy aliphatic carboxylic acid with itself, the derivatives being rubber-like materials.

It is another object of the present invention to bring about reaction between an ester of an unsaturated acid and a linear polyester to effect cross-linking of the latter.

Another object of the present invention is the preparation of a high molecular weight cross-linked polyester which can be milled, like rubber, with pigments and curing agents and then cured in a rubber mold under heat and pressure to give a vulcanized material with rubber-like properties.

A still further object of the present invention is a process for producing resins which can be cured by heating in the presence of an organic peroxide catalyst to produce a rubber-like material.

These and other objects are attained by bringing about reaction between an omega-hydroxy aliphatic carboxylic acid and a glycol acid ester of an alpha,beta-unsaturated aliphatic dicarboxylic acid in a molar ratio of from about 1:0.5 to 1:1. The reaction product is then milled with pigment other filler if desired, and peroxide curing catalyst, and cured by heating.

The invention will be described in greater detail in conjunction with the following specific examples in which the proportions are given in parts by weight. It should be understood that the examples are merely illustrative, and the scope of the invention is not to be limited to the details therein set forth.

EXAMPLE 1

Part A

| | Parts |
|---|---|
| Omega-hydroxydecanoic acid (0.4 mol) | 75 |
| Ethylene glycol acid maleate (0.4 mol) | 64 |

The above ingredients are placed in a suitable vessel and heated for 5 hours at 190°–200° C. During the heating the reaction mixture is agitated with a stream of carbon dioxide gas.

The viscous mixture obtained is transferred to a suitable shallow container and cooled, and a light amber-colored waxy resin is obtained.

Part B 50 parts of the above product, 75 parts of Mapico Red No. 297, an iron oxide pigment, and 2 parts of lauroyl peroxide are milled on a rubber mill, and the milled stock so-obtained is cured by heating in a rubber mold for 15 minutes at a temperature of 90° C. and at 500 lbs./in.$^2$ pressure. The cured sheet obtained is very rubbery.

EXAMPLE 2

Part A

| | Parts |
|---|---|
| Omega-hydroxydecanoic acid (1.6 mols) | 300 |
| Ethylene glycol acid maleate (1.6 mols) | 256 |

The above ingredients are treated as in Part A of Example 1 except that the heating is continued for 6½ hours. A light amber-colored waxy resin is obtained.

Part B 40 parts of the product obtained, 50 parts of acetone, and 50 parts of Cellosolve, i. e., the monoethyl ether of ethylene glycol, are placed in a suitable vessel and a solution of the resin in the acetone and Cellosolve is prepared by warming with agitation. The solution is cooled and 0.6 part of lauroyl peroxide is dissolved therein.

A piece of muslin is soaked in the solution obtained as described, passed through squeeze rolls, dried and heated under pressure in a hydraulic press for about 5 minutes at 100° C. The treated cloth is soft, pliable and water-repellent.

EXAMPLE 3

| | Parts |
|---|---|
| Omega-hydroxydecanoic acid (0.4 mol) | 75 |
| Propylene glycol acid maleate (0.4 mol) | 70 |

The procedure of Example 1, Part A, is followed except that the reaction mixture is heated for 9 hours. A light amber-colored waxy resin is obtained.

EXAMPLE 4

Part A

| | Parts |
|---|---|
| Omega-hydroxydecanoic acid (1.0 mol) | 188 |
| Ethylene glycol acid maleate (0.75 mol) | 120 |

The procedure of Example 1, Part A, is followed except that the reaction mixture is heated for 12 hours. A light amber-colored waxy resin is obtained.

Part B 40 parts of the product of Part A, 50 parts of acetone, and 50 parts of Cellosolve, i. e., the monoethyl ether of ethylene glycol, are warmed together with stirring. After the solution is cooled, 0.6 part of lauroyl peroxide is added.

A piece of muslin is soaked in the resulting solution and processed according to the details set forth in Part B of Example 2. The treated cloth is soft, pliable and water-repellent.

EXAMPLE 5

Part A 188 parts of Part A of Example 1 is followed except that the heating is continued for 15 hours. A light amber-colored waxy resin is obtained.

Part B

A solution consisting of 40 parts of the product of Part A, 50 parts of acetone, 50 parts of Cellosolve, i. e., the monoethyl ether of ethylene glycol, and 0.6 part of lauroyl peroxide is prepared and a piece of muslin soaked therein and processed, all according to the details set forth in Example 2, Part B. The treated cloth is soft, pliable and water-repellent.

Other omega-hydroxy saturated aliphatic carboxylic acids may be used in the present invention in place of the omega-hydroxydecanoic acid of the examples. Acids having from about 6 to about 20 carbon atoms are preferred. Examples of suitable acids are omega-hydroxystearic acid, omega-hydroxypalmitic acid, omega-hydroxymyristic acid, omega-hydroxycaproic acid, omega-hydroxycaprylic acid, etc.

Esters of alpha,beta-unsaturated aliphatic dicarboxylic acids suitable for cross-linking of the linear polymers include glycol acid esters of maleic acid, itaconic acid, fumaric acid, citraconic acid, etc. These acids may be esterified with a glycol such as ethylene glycol, propylene glycol, butylene glycol, diethylene glycol, triethylene glycol, dipropylene glycol, dibutylene glycol, etc., to produce the corresponding glycol acid esters. Ethylene glycol acid fumarate, diethylene glycol acid maleate, propylene glycol acid itaconate, propylene glycol acid fumarate, butylene glycol acid maleate, etc., are some examples of such esters. Particularly suitable are ethylene or propylene glycol acid maleate. Furthermore, a portion of the alpha,beta-unsaturated dicarboxylic acid may be replaced by a modifying acid such as sebacic acid, phthalic acid, adipic acid, etc.; for example, diethylene glycol acid fumarate-sebacate, dipropylene glycol acid maleate-adipate, etc., may be used to advantage.

The process of the present invention may be carried out at temperatures between about 180° and 220° C. and is preferably effected at a temperature of about 200° C. In order to avoid oxidation, we prefer carrying out the reaction in the presence of an inert gas such as, for example, nitrogen, carbon dioxide, etc.

The resin obtained upon reaction of omega-hydroxy saturated aliphatic carboxylic acid and glycol acid ester according to the process of the present invention can be cured by heating with a small amount of an organic peroxide. If the resin is milled on a rubber mill with an appropriate reinforcing pigment and peroxide curing agent, the milled stock can be cured under heat and pressure in a rubber mold to yield a strong and elastic rubber-like product.

Examples of suitable curing catalysts include the acidic peroxides, for example, benzoyl peroxide, phthalic peroxide, succinic peroxide, benzoyl acetic peroxide; the fatty oil acid peroxides, for example, coconut oil acid peroxide, lauric peroxide, stearic peroxide; the alkyl peroxides, for example, tertiary butyl hydroperoxide; and the terpene peroxides, for example, ascaridole, etc. In general the concentration of catalyst should be from about 1% to about 10% by weight of the resin.

In order to obtain products of the desired properties it is essential that the proportions of omega-hydroxy saturated aliphatic carboxylic acid and glycol acid ester used be carefully controlled. We have found that rubber-like products can be obtained if the hydroxy acid is reacted with the glycol acid maleate in a molar ratio of from about 1:0.5 to about 1:1.

The materials of the present invention closely resemble rubber, lacking its resilience and high tensile strength and elongation. However, they are superior to natural rubber in their gasoline, grease and oil resistance, their resistance to deterioration by actinic light, heat and/or air, and their relatively short time of cure. These and other properties put our new rubber-like products in the class of a specialty product. As such, they have many uses as substitutes for rubber in more or less static applications. Some of these include the fabrication of jar rings, shoe soles and heels, gaskets, special tubing, printing and typewriter rolls, etc. In addition, they find application in many industrial fields including laminating, coating, impregnating, etc. For example, the products of the present invention, before curing, may be used as textile or fabric impregnants to produce, after curing of the impregnated material, water-repellent products.

The resins of the present invention may be mixed with rubber whereupon they act not only as anti-oxidants, plasticizers and a means of lowering both the viscosity and the power required during milling, but also as vulcanization accelerators. They may be mixed with ester gum and various alkyd resins, particularly the oil-modified air-drying resins to produce lacquers, varnishes, enamels, etc. They may also be incorporated with phenol-formaldehyde resins, urea-formaldehyde resins, thiourea-formaldehyde resins, melamine-formaldehyde resins and other amino-aldehyde resins, either in solution or by admixture as solid resins.

Obviously, suitable fillers, dyes, and pigments may be mixed with the resins to modify the properties thereof as may be desirable. We have found that pigmenting of the resinous products of the present invention increases their tensile strength and any pigment may be incorporated with the resins to produce this effect. Some suitable pigments include iron oxides, carbon black, titanium dioxide, silicon dioxide, etc., as well as other pigments which are of suitable size to act as reinforcing pigments. Due to absorption of peroxide by carbon black, it is usually preferably used in admixture with other pigments.

Fillers other than pigments may also be incorporated with the resinous products of the present invention. These include wood flour, asbestos, calcium silicate, calcium carbonate, magnesium carbonate, talc, paper pulp, clay, glass filaments, mica, cotton flock, silica, etc.

When used in the present specification and claims, the term "rubber-like" is intended to cover products which may vary rather widely in appearance from rubbery to leathery but which have in common the following properties: the products are essentially thermoset and cross-linked chemically, their tensile strengths are increased by pigmenting, they cannot be readily reprocessed such as by calendering or remolding after they have become thermoset, and they can be cured by heating in the presence of an organic peroxide catalyst.

We claim:

1. A rubber-like product obtained by heating at 180° to 220° C. an omega-hydroxy saturated aliphatic carboxylic acid with a glycol acid ester of an alpha,beta-unsaturated dicarboxylic acid in a molar proportion from 1:0.5 to 1:1 and curing the reaction product obtained by heating in the presence of an organic peroxide catalyst, said ester being prepared from equimolar proportions of glycol and dicarboxylic acid.

2. A rubber-like product obtained by heating at 180° to 220° C. an omega-hydroxy saturated aliphatic carboxylic acid with a glycol acid ester of an alpha,beta-unsaturated dircarboxylic acid in a molar proportion of from 1:0.5 to 1:1, milling the reaction product obtained with a pigment and an organic peroxide curing agent, and curing the milled reaction product by heating, said ester being prepared from equimolar proportions of glycol and dicarboxylic acid.

3. A rubber-like product obtained by heating at 180° to 220° C. omega-hydroxydecanoic acid with ethylene glycol acid maleate in a 1:1 molar ratio, milling the resin obtained with a pigment and an organic peroxide curing agent, and curing the milled resin by heating, said ethylene glycol acid maleate being prepared from equimolar proportions of ethylene glycol and maleic acid.

4. A process which comprises heating at 180° to 220° C. an omega-hydroxy saturated aliphatic carboxylic acid with a glycol acid ester of an alpha,beta-unsaturated dicarboxylic acid in a molar ratio of from 1:0.5 to 1:1, and then curing the reaction product obtained by heating in the presence of an organic peroxide catalyst, said ester being prepared from equimolar proportions of glycol and dicarboxylic acid.

5. A process of preparing a rubber-like product which comprises heating at 180° to 220° C. omega-hydroxydecanoic acid with an ethylene glycol acid maleate in a molar proportion of from 1:0.5 to 1:1, milling the resin obtained with a pigment and an organic peroxide curing agent, and curing the milled resin by heating, said ethylene glycol acid maleate being prepared from equimolar proportions of ethylene glycol and maleic acid.

6. A textile treating composition comprising a solution in an organic solvent of a product obtained by heating at 180° to 220° C. omega-hydroxydecanoic acid with ethylene glycol acid maleate in a 1:1 molar ratio, said solution containing an organic peroxide curing agent, said ethylene glycol acid maleate being prepared from equimolar proportions of ethylene glycol and maleic acid.

DAVID W. JAYNE, Jr.
HAROLD M. DAY.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,374,598 | Gray | Apr. 24, 1945 |
| 2,418,633 | Gould | Apr. 8, 1947 |